(12) United States Patent
Salvado et al.

(10) Patent No.: US 7,188,006 B2
(45) Date of Patent: Mar. 6, 2007

(54) DEVICE AND PROCESS FOR DOCUMENTARY ASSISTANCE OF AN AIRCRAFT OPERATOR, IN PARTICULAR A PILOT OF THE AIRCRAFT

(75) Inventors: Felipe Salvado, Toulouse (FR); Frédérique Populus, Fontenilles (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/105,795

(22) Filed: Mar. 26, 2002

(65) Prior Publication Data
US 2002/0143440 A1    Oct. 3, 2002

(30) Foreign Application Priority Data
Mar. 27, 2001    (FR)    ................................ 01 04085

(51) Int. Cl.
*G06F 11/30*    (2006.01)
*G06F 15/02*    (2006.01)

(52) U.S. Cl. ..................... 701/3; 244/158 R; 340/971
(58) Field of Classification Search .................... 701/3, 701/13, 14, 29, 34, 39; 244/158 R; 340/971; 702/81, 82
See application file for complete search history.

(56) References Cited

U.S. PATENT DOCUMENTS

| 3,611,300 | A | * | 10/1971 | Aldrich et al. ................ 712/34 |
| 4,220,994 | A | * | 9/1980 | Hendrickson ............... 701/217 |
| 5,475,594 | A | | 12/1995 | Oder et al. |
| 5,890,079 | A | | 3/1999 | Levine |
| 5,951,611 | A | * | 9/1999 | La Pierre ..................... 701/29 |
| 6,112,141 | A | * | 8/2000 | Briffe et al. .................. 701/14 |
| 6,181,987 | B1 | * | 1/2001 | Deker et al. ................... 701/3 |
| 6,262,720 | B1 | * | 7/2001 | Jeffrey et al. ............... 715/710 |
| 6,385,513 | B1 | * | 5/2002 | Murray et al. ................ 701/14 |
| 6,456,928 | B1 | * | 9/2002 | Johnson ...................... 701/114 |
| 6,542,796 | B1 | * | 4/2003 | Gibbs et al. ................... 701/3 |
| 2002/0035416 | A1 | * | 3/2002 | De Leon ..................... 701/14 |

OTHER PUBLICATIONS

Ulbrich, E.A. Jr.: "No Room for Rembrandt: Combining WXR, TCAS, TAWS, FMS, VMS, and CNI on One Display", Digital Avionics Systems Conference, 1999, Proceedings 18th /IEEE Xplore, vol. B. 6-6, No. 2, pp. 6.C.1-1-6.C.1-8, Oct. 1999.

* cited by examiner

*Primary Examiner*—Dalena Tran
(74) *Attorney, Agent, or Firm*—Stevens, Davis, Miller & Mosher, LLP

(57) ABSTRACT

The documentary assistance device (1) comprises sources of computer data (S1 to Sn, B1 to Bp) relating to said aircraft, to elements of the latter, as well as to the outside environment, an interrogation means (2) capable of being activated by an operator so as to generate a request for information relating to the execution of at least one particular task, an information presentation means (5), and a central processing unit (6) searching the data sources (S1 to Sn, B1 to Bp) in response to the creation of a request for information by the interrogation means (2), for data relating to the execution of the task, collecting these data and transmitting them, in the form of information, to the information presentation means (5) with a view to their presentation to the operator.

9 Claims, 1 Drawing Sheet

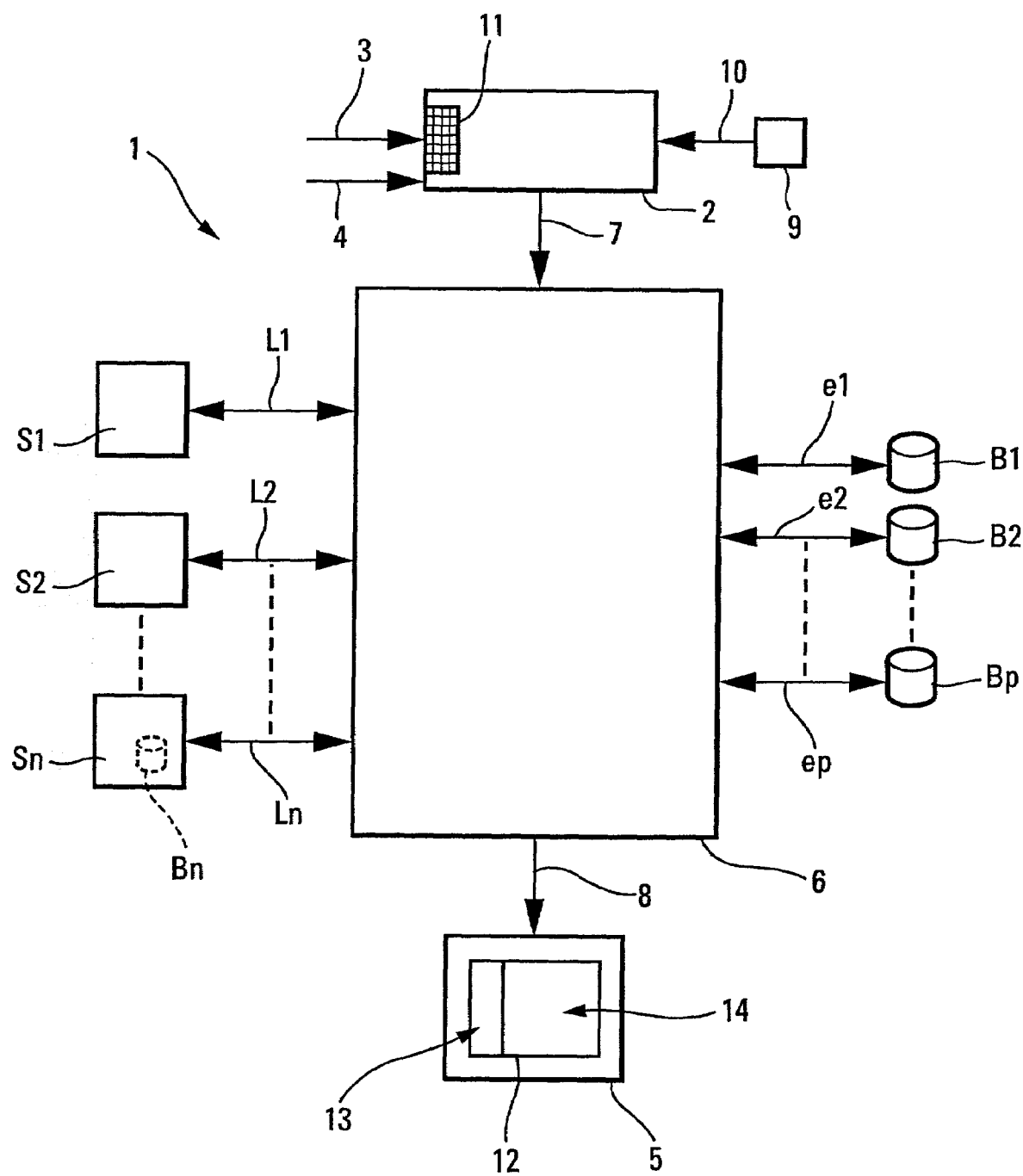

DEVICE AND PROCESS FOR DOCUMENTARY ASSISTANCE OF AN AIRCRAFT OPERATOR, IN PARTICULAR A PILOT OF THE AIRCRAFT

BACKGROUND OF THE INVENTION

The present invention relates to a device and a process for documentary assistance of at least one operator of an aircraft, in particular a pilot of the aircraft, to assist said operator in the execution of at least one of a plurality of different tasks.

Within the framework of the present invention, this may pertain to tasks which are to be accomplished before, during or after the flight of the aircraft. These tasks may be:
- either programmed tasks, such as the drawing up of a flight plan or the monitoring of the fuel during the flight for example;
- or non-programmed tasks, such as the allowance for a late modification of the load, the planning of an unscheduled diversion or the drawing up of an assessment following a fault with a system of the aircraft for example.

It is known that the crew of an aircraft, in particular of a civil transport plane, currently have a large quantity of information at their disposal. Unfortunately, this information is usually dispersed among several documents (records, binders, etc.) or systems and it is sometimes difficult for the crew to find a sought-after piece of information from among these various sources of information within the time allocated.

It is known moreover that in order to take a decision with a view to the execution of a particular task, a certain amount of accurate and up-to-date data relating to this task generally needs to be collected by the crew as quickly as possible before summarizing it in order to form an opinion with regard to the actual situation. However, since searching through data records is often lengthy and onerous, the crew usually having to interrogate various systems and/or consult various documentation binders, etc., it follows that the time and workload which are required for these operations are sometimes incompatible with the time constraints with which the crew is confronted, whether this be on the ground in conjunction with a take-off slot, for example, or in flight.

The drawbacks of this state of affairs are multifold. In numerous cases, this leads the crew to take non optimal decisions under time pressure, without waiting for and ascertaining the corresponding accurate data. In other cases where the crew cannot do without such data, this may lead them to miss their time slot, in particular their take-off slot, and hence cause delays. Of course, all these negative consequences create losses for the corresponding airline company.

DESCRIPTION OF THE PRIOR ART

Additionally, the document U.S. Pat. No. 5,475,594 discloses an on-board documentary assistance device, comprising:
- sources of computer data embodied in the forms of databases;
- information interrogation and presentation means; and
- a central processing unit which is linked to the above elements, which searches the databases for the data relating to the execution of a task, which gathers these data and transmits them to an information presentation means with a view to their presentation to an operator.

This known device has numerous drawbacks however. In particular:
- only the information recorded in the databases is accessible, so that this device is not completely reliable; and
- the presentation of information is difficult to read and to understand, by reason in particular of the sum total of information of varied interests, which is available.

SUMMARY OF THE INVENTION

The object of the present invention is to remedy these drawbacks. It relates to a device for documentary assistance of at least one operator of an aircraft, in particular a pilot of the aircraft, to assist said operator in the execution of at least one of a plurality of different tasks.

Accordingly, according to the invention, said device for documentary assistance of at least one operator of an aircraft, in particular a pilot of the aircraft, for assisting said operator in the execution on the aircraft of at least one of a plurality of different tasks, said documentary assistance device being carried on board said aircraft and comprising:
- a plurality of sources of computer data comprising at least data relating to said aircraft, to elements of the latter, as well as to the outside environment;
- an activatable interrogation means, serving as interface between said operator and said documentary assistance device and capable of being activated by said operator so as to generate a request for information relating to the execution of at least one of said tasks;
- an information presentation means; and
- a central processing unit linked to said data sources, to said interrogation means and to said information presentation means and capable of searching said data sources, in response to the creation of a request for information by said interrogation means, for data relating to the execution of the corresponding task, of collecting the data thus searched for and of transmitting them, in the form of information, to said information presentation means with a view to their presentation to the operator, is noteworthy in that said sources of computer data comprise systems existing on the aircraft and associated with elements of said aircraft, in that said central processing unit is capable of searching all said sources of computer data for all the data relating to the execution of a task and of collecting them into a plurality of groups exhibiting levels of details which differ, and in that said information presentation means present at least one of these levels to the operator, said operator being able to select the other levels by way of said interrogation means so as to display the level which he wishes to consult.

Thus, by virtue of the invention, the operator is presented (automatically and rapidly) with all the information relating to the task which he is to execute so that he does not have to perform searches. Consequently, he can rapidly take the appropriate decisions for executing the corresponding task, while knowing that he has all the existing and necessary information at his disposal, this representing moreover a considerable psychological comfort.

Furthermore, since the information is collected in an organised manner before being presented, the reading and the understanding of this information are simplified and decision taking is made easier. Moreover, the collecting of the data into a plurality of groups exhibiting levels of details which differ enables a summary data item (which is for example sufficient for an experienced operator) not to be drowned amid numerous details (which are for example necessary for a less experienced operator in order to properly pinpoint the situation and take a decision), while providing rapid and easy access to the more detailed information. The operator can thus choose the level of details which is most appropriate for him.

It will be noted that, within the framework of the present invention, said systems existing on the aircraft are associated with elements, such as the engines, the lighting, the wings, etc. and are above all intended to carry out particular functions, such as help with piloting, with navigation or with the processing of a fault for example. The device in accordance with the invention thus has real-time access to information relating to actual values which are available on the aircraft and it is, therefore, especially reliable.

According to the invention, said sources of computer data also comprise, advantageously, databases which can:

- pre-exist on the aircraft or be provided specifically for the implementation of the present invention;
- be independent (such as for example an airline company's list of preferred airports of diversion) or be contained in a system (such as for example the navigation database contained in the flight management system); and/or
- be permanent (such as the aforesaid database) or be modifiable, in particular by the systems of the aircraft, especially during flight (such as for example the approach checklist in the event of a system fault).

Additionally, advantageously, the device in accordance with the invention moreover comprises at least one monitoring means monitoring at least one particular parameter, such as the fuel or the weather for example, and capable of automatically activating said interrogation means so as to generate a request for information, as a function of the results of said monitoring.

Furthermore, in a particular embodiment, said interrogation means and said information presentation means form part of one and the same dialogue interface comprising at least one screen and one keyboard. In this case, preferably, said screen displays at least one navigation zone intended for creating requests for information and for selecting information to be presented and a work zone intended for presenting the selected information.

The present invention also relates to a process for documentary assistance of at least one operator of an aircraft, in particular a pilot of the aircraft, for assisting said operator in the execution of at least one of a plurality of different tasks.

According to the invention, said documentary assistance process according to which a request for information relating to the execution of a task is generated, and upon the generation of such a request, the following operations are carried out successively and automatically:

a) data relating to the execution of said task is searched for in a plurality of sources of computer data comprising at least data relating to said aircraft, to elements of the latter, as well as to the outside environment;
b) the data thus searched for is collected; and
c) information associated with at least some of the data thus collected is presented to said operator, by way of an information presentation means, is noteworthy in that in step a), all the data relating to the execution of said task is searched for in all said sources of computer data which comprise systems existing on the aircraft and associated with elements of said aircraft, in that in step b), the data are collected according to several levels of details, and in that in step c), at least one of these levels is presented to the operator, said operator being able to select the other levels so as to display the level which he wishes to consult.

Preferably, at least some of the following information is presented to the operator, following the search for data:
- the data themselves;
- the place where the data are located;
- the result of a processing carried out on the basis of the data; and
- a proposal of calculation on the basis of the data.

Advantageously, said sources of data comprise at least some of the following data:
- bibliographic data;
- changing data;
- data emanating from systems of the aircraft; and
- data proposing actions to be undertaken.

Furthermore, advantageously, to ease the selection of the information to be presented, a tree-like list making it possible to access the various information available is displayed.

BRIEF DESCRIPTION OF THE DRAWINGS

The single FIGURE of the appended drawing will elucidate the manner in which the invention may be embodied. It represents a schematic diagram of a documentary assistance device in accordance with the invention.

DESCRIPTION OF THE PREFERRED EMBODIMENT

The device 1 which is carried on board an aircraft and which is, preferably, at least partially arranged in the cockpit of the aircraft, is intended for the documentary assistance of at least one operator, for example a pilot, or even of the entire crew of said aircraft, in particular a civil transport plane, so as to assist said operator or said crew in the execution of at least one of a plurality of different tasks. This may pertain to programmed or non-programmed tasks, which have to be accomplished before, during, or after the flight.

According to the invention, said device 1 comprises:
- a plurality of sources of computer data S1 to Sn, B1 to Bp, specified hereinbelow and comprising at least data relating to said aircraft, to elements (engines, landing gear, etc.) of the latter, as well as to the outside environment (weather, runway, etc.);
- an activatable interrogation means 2, serving as interface between said operator (not represented) and said documentary assistance device 1 and capable of being activated by said operator, as illustrated by arrows 3 and 4, so as to generate a request for information relating to the execution of at least one of said tasks;
- an information presentation means 5; and
- a central processing unit 6 which is linked:
  - by way of two-way links L1 to Ln and e1 to ep, to said data sources S1 to Sn and B1 to Bp respectively; and
  - by way of links 7 and 8 to said means of interrogation 2 and to said information presentation means 5 respectively.

Said central processing unit 6 is capable of searching said data sources S1 to Sn, B1 to Bp, in response to the creation of a request for information by said interrogation means 2, for data relating to the execution of the corresponding task, of collecting the data thus searched for and of transmitting them, in the form of information, to said information presentation means 5 with a view to their presentation to the operator, as specified hereinbelow.

According to the invention, said sources of computer data (that is to say implementing automatic and rational processing of the information) are:

databases B1 to Bp, p being an integer greater than 1, which may:
- pre-exist on the aircraft or be provided specifically for the implementation of the present invention;
- be independent (such as for example an airline company's list of preferred airports of diversion) or be contained in a system (such as for example the navigation database contained in the flight management system (FMS));
- be permanent (such as the aforesaid navigation database) or be modifiable, in particular by the systems of the aircraft, especially during flight (such as for example the approach checklist in the event of a system fault); and/or systems S1 to Sn, n being an integer greater than 1, which exist on the aircraft and which are associated with elements, such as the engines, the lighting, the wings, etc. of the aircraft. These systems are either integrated into these elements, or external to them, and are for example capable of measuring parameters relating to said elements (such as the speed of an engine for example). These systems are especially intended for carrying out particular functions, such as help with piloting, with navigation or with the processing of a fault for example.

Certain databases may also be integrated directly into certain of these systems S1 to Sn, as illustrated for a base Bn in the FIGURE.

Thus, according to the invention, said sources of computer data S1 to Sn, B1 to Bp comprise at least some of the following data:
- bibliographic data;
- changing data;
- data emanating from systems of the aircraft, such as in particular the flight management system (FMS); and
- data proposing actions to be undertaken.

Furthermore, the interrogation means 2 comprises a keyboard 11, by way of which the operator can carry out a dialogue with the device 1, as illustrated by the arrow 3. Said interrogation means 2 can also comprise other known elements (not represented), in particular a computer mouse, a designator, a trackball or a touch screen, so as to allow such a dialogue, as illustrated by the arrow 4.

A dialogue of this type can consist of course, as far as the operator is concerned, in generating requests for information, but not uniquely. The operator can also use the keyboard 11 and the other means placed at his disposal to select information to be displayed or to input data, in particular so as to carry out calculations, as will be seen in greater detail hereinbelow.

The device 1 moreover comprises at least one monitoring means 9, of standard type, which monitors a parameter of the aircraft, of one of its elements (engines, lighting, etc.) or of the environment, such as the fuel or the weather for example. This monitoring means 9 is capable of activating the interrogation means 2 automatically by way of a link 10, in particular so as to generate a request for information, as a function of said monitoring and in particular in the event of a fault or disturbance to the functioning of the monitored element.

After searching for all the data relating to a particular task, which was requested by way of the interrogation means 2 automatically or following an action of the operator, the central processing unit 6 collects and organizes these data, then transmits them to the information presentation means 5 in order for the latter to present them to the operator.

According to the invention, the central processing unit 6 can organize the data in various ways. It is thus possible for it to collect said data into a plurality of groups exhibiting levels of details which differ. It can however also group the data together into subject matter such as weather data, limitations, etc.

The organization of the information is carried out so as to ease the reading and the understanding of the information which is presented to the operator. An organization which makes it possible to tailor the documentary assistance afforded by the device 1, easily and rapidly, to the level of knowledge of the operator (general knowledge, knowledge of the operational context, etc.) and/or to his need for information at the relevant instant is preferably chosen.

To carry out the presentation of information, the means 5 comprises at least one screen 12 making it possible to display said information. Of course, said means 5 can also comprise other known means, for example a printer or a voice signal generator, making it possible to present information.

To improve the presentation of information and to increase the understanding of various information, said screen 12 displays at least one navigation zone 13 intended for creating requests for information and for selecting the information to be presented (which has been previously been collected into various groups) and at least one work zone 14 intended for presenting the selected information.

In another embodiment (not represented), control buttons organized into menus and sub menus are used. This makes it possible to hierarchize the functions, but in this case these functions are not visible as a whole. Against this, such an interface yields a larger surface for displaying the functions. Moreover, in this case it is possible to run several functions simultaneously owing to the multiwindowing capabilities. This makes it possible, for example, to efficiently manage the interruptions which may arise in a cockpit (two tasks may in fact be conducted simultaneously: when the pilot is initializing the systems, the flight dispatcher may for example request him moreover to evaluate a change of weight).

Furthermore, to ease the selection of the information in the example represented in the FIGURE, the means 5 displays at the level of the navigation zone 13 a treelike list making it possible to access the various information available. The principle of selecting from a tree-like list is well known: the information is organized in folders (which are opened for example via a mouse click or via selection via the keyboard 11, followed by the pressing of a particular key), thereby making it possible to select the desired page, the latter then being displayed in the work zone 14.

In particular, to promote direct and intuitive access to the various information, the device 1 can comprise various known technological means (not represented), such as:
- hypertext links for access to information available on a given subject, within the operational context of the relevant flight;
- means for easing access to applications already existing in certain systems;
- means allowing access to data emanating from various systems without making it necessary to change interface; and shared databases for minimizing the copying of data and ensuring consistency between the calculational assumptions of the various applications.

In a particular embodiment (not represented), the interrogation means 2 and the information presentation means 5 can form part of one and the same interrogation interface, which is preferably mounted in the cockpit and which comprises a keyboard 11 and a screen 12.

To summarize, on the basis of the various data searched for by the central processing unit 6, the means 5 presents at least some of the following information:
- the data themselves; and/or
- the place where the data are located; and/or
- the result of a processing carried out on the basis of said data; and/or
- a proposal of calculation on the basis of said data.

When possible, efforts will be made to provide the crew with the data necessary for depicting the "operational domain" while favoring the graphical representations which give a good idea of the variational trend, without however neglecting the numerical aspect which makes it possible to obtain the precise value of the data item, while allowing for the operational context of the mission (limitations and margins to be complied with, flight plan and limitations due to faults with the systems).

Additionally, to ease the task of the operator or of the crew of the aircraft, the device 1 can place calculational tools at his/their disposal, relieving him/them as far as possible of the lengthy manual processing operations which are a potential source of errors (for example by replacing the perusal of the numerous performance curves on take-off with a calculational application). This implies that the crew then find themselves in the situation of a processing performed partly by a system. To allow verification of the initial data, the crew will be given the possibility of accessing the set of calculational assumptions taken into account by the system when performing its processing and their analysis will be made easier by a logical organization consisting in grouping the data by subject matter (for example: weather data, limitations, etc.).

It is also possible to provide an advanced mode of consultation in respect of the documentation available on board the aircraft, according to which mode, as a function of the operational context (flight phase, etc.), the device 1 proposes an access which will point to the appropriate sections (hydraulic fault, etc.) from among all the available documents.

Additionally, in order to promote optimal and intuitive use of the device 1, particular care will be afforded to the guidance of the operator throughout his perusal of the functions of the device 1. This may be manifested as an indication of the actions to be performed in the normal process of using the device 1, such as re-running the calculation after modifications of the input data, transferring the results to certain systems so as to take account of planned modifications, etc. The guidance can also include the pre-positioning of a cursor over a subsequent field to be filled in (the movement of the cursor must however remain predictable), as well as help means such as info-bubbles or on-line help.

The device 1 also allows access to on-board electronic documentation. Accordingly, two main modes of use of this documentation are provided: an ordinary mode and a contextual mode. The ordinary mode corresponds to the normal use of a documentation with certain advantages related to its electronic form (faster searching, by key words in particular, or else through several volumes when ignorant of the precise location of the information, hypertext links for navigation, etc.). The contextual mode profits from the fact that the device 1 is informed of the operational context so as to pre-position the documentation. In the fault management module for example, the "FCOM" page relating to a particular detected fault will be given priority of presentation, likewise the list of indispensable equipment for the flight (MEL: "Minimum Equipment list") will give priority display to the objects relevant to this fault. These advantages in terms of use are supplemented with simplified and faster updating possibilities.

Consequently, the device 1 in accordance with the invention provides the operator with easy, fast and intuitive access to the information (which he needs in order to execute a task: take a decision, respond to a problem, etc.) and to this information uniquely. Moreover it makes it possible to unburden the operator of elementary tasks requiring a great deal of time, in particular by delegating the tasks which demand a considerable number and considerable accuracy of calculations to the systems of the aircraft.

Said device 1 is not an expert system, but it is a system which provides all the information which the operator needs in order to take a decision so as to execute a particular task.

By way of illustration, on the ground, the device 1 can warn the crew when a data item is modified, thereby partly freeing them from their monitoring task and enabling them to better manage the interruptions on the part of the various players possessing information. By providing the crew with centralized access to all the data, they are able to construct a mental image for themselves which is a faithful image of the operational context of the mission.

The invention claimed is:

1. A device for documentary assistance of at least one operator of an aircraft, in particular a pilot of the aircraft, for assisting said operator in the execution on the aircraft of at least one of a plurality of different tasks, said documentary assistance device being carried on board said aircraft and comprising:
   - a plurality of sources of computer data comprising at least data relating to said aircraft, to elements of the latter, as well as to the outside environment;
   - an activatable interrogation means, serving as interface between said operator and said documentary assistance device and capable of being activated by said operator so as to generate a request for information relating to the execution of at least one of said tasks;
   - an information presentation means;
   - a central processing unit linked to said data sources, to said interrogation means and to said information presentation means and capable of searching said data sources, in response to the creation of a request for information by said interrogation means, for data relating to the execution of the corresponding task, of collecting the data thus searched for and of transmitting them, in the form of information, to said information presentation means with a view to their presentation to the operator; and
   - at least one monitoring means monitoring at least one particular parameter and capable of automatically activating said interrogation means so as to generate a request for information, as a function of the results of said monitoring, wherein:
   - said sources of computer data comprise systems existing on the aircraft and associated with elements of said aircraft, wherein said central processing unit is capable of searching all said sources of computer data for all the data relating to the execution of a task and of collecting them into a plurality of groups, wherein for each situation there are a plurality of groups exhibiting levels of details which differ, which makes it possible to tailor the documentary assistance to the level of knowledge of the operator and to his need for information at the relevant instant, for properly pinpointing the situation, said information presentation means present at least one of these levels to the operator, said operator being able to select the other levels by way of said interrogation means so as to display the level which he wishes to consult, said interrogation means and said information presentation means form part of one and the same dialogue interface comprising at least one screen and one keyboard, and said screen displays at least one navigation zone intended for creating requests for information and for selecting information to be presented and a work zone intended for presenting the selected information.

2. The device as claimed in claim 1, wherein said sources of computer data comprise databases.

3. A process for documentary assistance of at least one operator of an aircraft, in particular a pilot of the aircraft, for assisting said operator in the execution on said aircraft of at least one of a plurality of different tasks, according to which process a request for information relating to the execution of a task is generated, and upon the generation of such a request, the following operations are carried out successively and automatically:

a) data relating to the execution of said task is searched for in a plurality of sources of computer data comprising at least data relating to said aircraft, to elements of the latter, as well as to the outside environment;

b) the data thus searched for is collected; and c) information associated with at least some of the data thus collected is presented to said operator, by way of an information presentation means, wherein in step a), all the data relating to the execution of said task is searched for in all said sources of computer data which comprise systems existing on the aircraft and associated with elements of said aircraft, wherein in step b), for each situation there are a plurality of groups exhibiting levels of detail that differ and the data are collected according to several levels of details, which makes it possible to tailor the documentary assistance to the level of knowledge of the operator and to his need for information at the relevant instant, for properly pinpointing the situation, and wherein in step c), at least one of these levels is presented to the operator, said operator being able to select the other levels so as to display the level which he wishes to consult, and said request for information is generated automatically, as a function of the result of the monitoring of a parameter.

4. The process as claimed in claim 3, wherein in step c), at least some of the following information is presented to the operator, following the search for data:

the data themselves;
the place where the data are located;
the result of a processing carried out on the basis of the data; and
a proposal of calculation on the basis of the data.

5. The process as claimed in claim 3, wherein a tree-like list making it possible to access the various information available is displayed.

6. The process as claimed in claim 3, further comprising:
providing the operator access to a set of calculational assumptions taken into account when performing the process; and
logically organizing the data by grouping the data by subject matter to make the operator's analysis of the data easier.

7. The process as claimed in claim 3, wherein as a function of the operational context, an access which will point to the appropriate sections from among all available documents is proposed, to provide an advanced mode of consultation in respect of the documentation available on board the aircraft.

8. The process as claimed in claim 3, further comprising:
pre-positioning a cursor over a field to be filled in; and
providing a help means and on-line help.

9. The process as claimed in claim 3, further comprising providing access to on-board electronic documentation according to a contextual mode, in which information of the operational context is available to the process, so as to pre-position the documentation.

* * * * *